Sept. 12, 1961
C. L. BABB
2,999,465
DOUBLE CASING MULTIPLE STAGE PUMP
Filed July 23, 1958
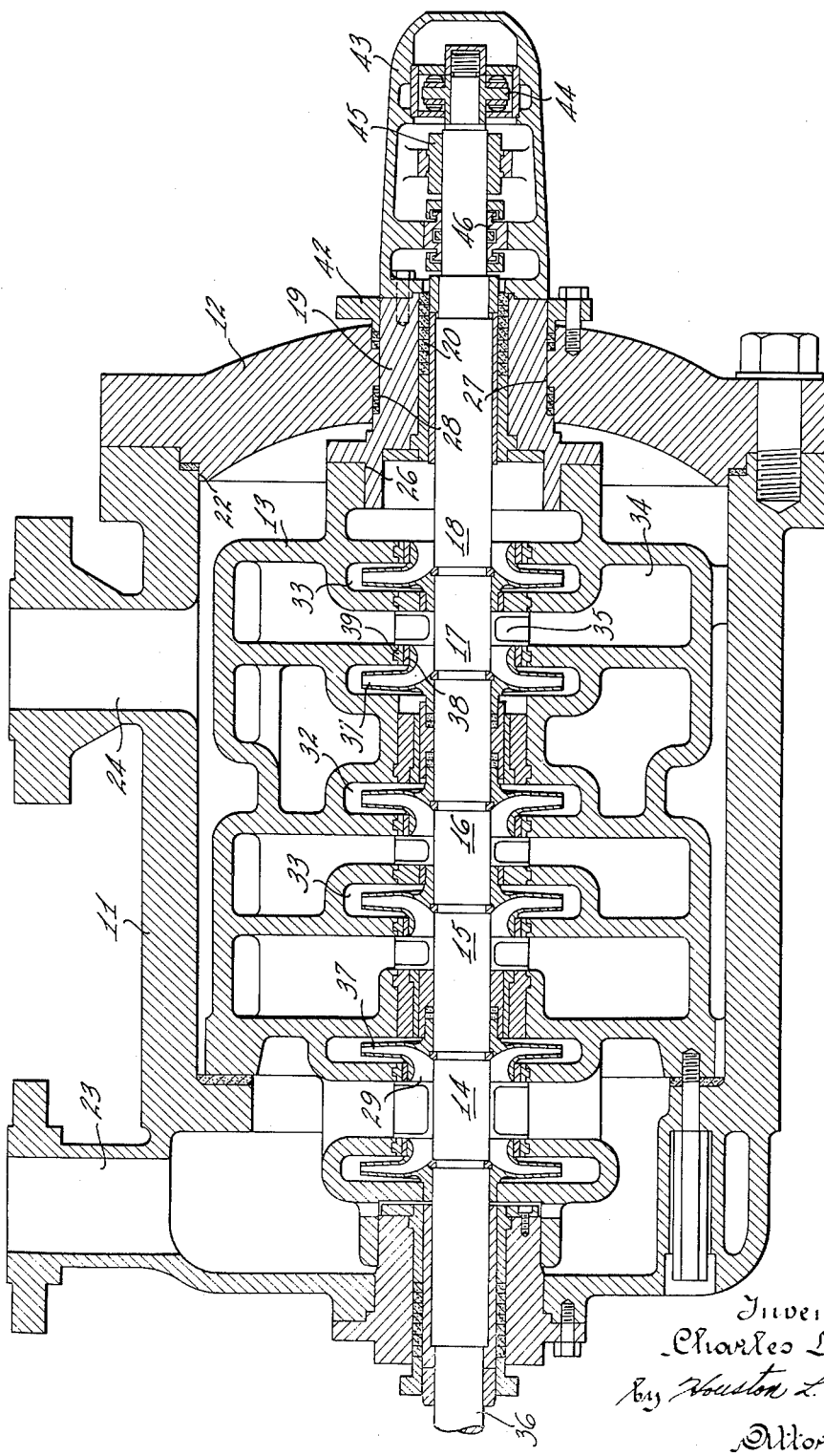
Inventor
Charles L. Babb
By Houston L. Swenson
Attorney United States Patent Office 2,999,465
Patented Sept. 12, 1961

2,999,465
DOUBLE CASING MULTIPLE STAGE PUMP
Charles L. Babb, Brookfield, Wis., assignor to Allis-Chalmers Manufacturing Company, Milwaukee, Wis.
Filed July 23, 1958, Ser. No. 750,388
3 Claims. (Cl. 103—107)

This invention relates to double casing multiple stage pumping units. More specifically this invention relates to maintaining the impellers of a multiple stage pump shaft in alignment with the inner casing of a double casing pump.

Similar to other types of centrifugal pumps it is highly desirable to maintain the pump shaft and impellers of a double casing multiple stage pump in alignment with the inner casing of the pump. If there is even a slight deflection between the shaft and inner casing, undesirable leakage and uneven wear may result between the moving parts of the impellers and the inner casing. This alignment problem becomes more difficult in double casing pumps where the pump shaft is supported by externally located oil lubricated thrust bearings which, as has been done in the past, are in a housing mounted on the outer casing. The misalignment problem has been attributed to the relative movement between the inner and outer casings. This in turn causes relative movement between the inner casing and the shaft which is indirectly attached to the outer casing by the thrust bearings. The outcome is misalignment between the impellers that are mounted on the shaft and the volutes that are a part of the inner casing.

The relative movement between the inner and outer casing has been partly attributed to the temperature differential between the casings. A second cause is that the outer casing is subjected to high discharge pressures on its inner side and to atmospheric pressure on its outer side with the greatest pressure differential occurring at the pump outlet near the head of the pump. Therefore, while the pump is operating, the outer casing distorts in an outward direction in an area near its head and cover. On the other hand, the inner casing is subjected to the high discharge pressures of the pump on its outer side, and on its inner side, is subjected to pressures that vary at each pumping stage, but certainly much above atmospheric pressure. Because of the design and the inherent high compression strength of the casing material, the inner casing has relatively good resistance to deformation as compared to the outer casing. The pressure differential on the inner casing is much less than on the outer casing. The pressure differential that does exist results in a squeezing effect; and because the casing material has high compression strength, the inner casing will remain relatively stationary while the pump is in operation. The result of all the forces acting on the casings is that the outer casing expands and moves outwardly relative to the inner casing while the pump is operating.

In the pump of this invention a stuffing box containing suitable sealing material is mounted directly on the inner casing of the double casing multiple stage pump. Rigidly fixed to the end of the stuffing box opposed to the inner casing is a thrust bearing casing which surrounds and supports the thrust bearing. The outer casing has a cover which encircles the stuffing box and is arranged in such a manner as to permit axial sliding between the stuffing box and the cover. Consequently, deflection of the cover due to high internal pressures developed by the pump does not affect bearing alignment and position with respect to the inner casing. Therefore, no matter what the thermal end pressure differentials might be between the inner casing and the outer casing, there is no relative movement between the thrust bearing and the inner casing. In such a manner the shaft and impellers are maintained in a stable position relative to the volutes of the inner casing.

An object of this invention is to provide a new and improved means for mounting the external and independently lubricated thrust bearings of a double casing multiple stage pump.

Another object of this invention is to provide a new and improved means for maintaining the thrust bearings of a double casing multiple stage pump in a fixed relative position with respect to the inner casing.

Another object of this invention is to provide a means for maintaining the shaft and impellers of a double casing multiple stage pump in a fixed relative position with respect to the volutes of the pump.

Objects and advantages other than those set forth above will be apparent as the description of the invention proceeds when read in connection with the accompanying drawing in which:

The figure is a longitudinal section of a double casing multiple stage centrifugal pump embodying the invention.

The double casing multiple stage centrifugal pump as illustrated in the figure comprises an outer casing 11, an outer casing cover 12, an inner casing 13, a series of pumping stages 14, 15, 16, 17, 18, and a sleeve housing 19 for sealing material, commonly called a stuffing box. The outer casing 11 is opened at one end 22 and has an inlet 23 and outlet 24. A casing cover 12 defining a centrally located aperture 27 is removably attached to the open end 22 of outer casing 11.

The inner casing 13 is mounted in the outer casing 11 and has an open end 26. A flexible material is fixed between the cover and stuffing box to serve as a compensator 28 for allowing expansion between the inner and outer casings. The inner casing 13 has an inlet 29 and an outlet 32 which are aligned with and communicate respectively with the inlet 23 and outlet 24 of the outer casing 11. In the inner casing 13 are a series of annular passageways or volutes 33 that form pump stages 14, 15, 16, 17 and 18. All the stages of the pump are hydraulically connected in successive series. Thus, discharge 34 of stage 18 enters inlet 35 of stage 17 and so on to the next successive stage until the terminal stage 16 is reached.

A shaft 36 is rotatably mounted in the inner casing 13 and extends through the aperture 27 in the cover 12. Impellers 37 are mounted on the shaft 36 for rotation therewith and are operatively disposed to rotate within the volutes 33. The impellers 37 transmit the fluid from the inlet of the first stage 14 at inlet pressure through the axially spaced and hydraulically connected stages to the terminal stage 16, successively increasing the pressure in each stage. Circumferentially mounted on the hub of each impeller is an impeller wearing ring 38. Mounted on the inner casing and circumferentially spaced from ring 38 is a casing ring 39. The space between rings 38 and 39 are preferably .007 of an inch and permits the control of a minimum amount of leakage between adjacent stages. In the event that the casing ring and impeller ring get out of alignment during operation of the pump the space will increase causing an undesirable amount of leakage and lowering of the pump's efficiency. Through applicant's invention misalignment of the rings caused by relative movement between the inner and outer casings is eliminated.

Suitable means are provided to support inner casing 13 in proper axial alignment relative to outer casing 11. In the preferred embodiment of this invention, as shown in the figure stuffing box 19 containing sealing means 20 surrounds shaft 36 to hydraulically seal the shaft to the inner casing 13 and to assist in maintaining the inner casing in proper axial alignment with the outer casing 11. The stuffing box 19 is attached to open end 26 of the inner casing by suitable means such as by bolts (not shown) and is positioned in the aperture 27 of the cover 12. The cover is slidably mounted on the stuffing box and packing means 42 are positioned between the stuffing box and the cover to insure a liquid tight seal. This arrangement allows axial response to the changes in pressure and/or temperatures within the outer casing.

An external bearing casing 43 is held in perfect alignment by machine fits with the stuffing box casing. Mounted within the bearing casing and encircling the pump shaft is a thrust bearing assembly 44. The bearing assembly is lubricated by a fluid independent of that flowing through the various stages of the pump. A sleeve bearing 45 also encircles the shaft to further position it. In order to prevent hydraulic communication between pumped fluid in the stuffing box 19 and lubricant such as oil in the thrust bearing casing 43, a sealing means 46 may be positioned within the bearing casing and surrounding the pump shaft.

In operation, as a fluid is circulated through the pump pressure builds up between the inner casing and outer casing. As a result of this pressure the outer casing and its cover tend to deflect outwardly. Unlike pumps of the prior art which had their bearings housed in casings directly fixed either to the outer casing or its cover, the thrust bearings in the pump of this invention are unaffected by deflection of the outer casing or cover. This is because the bearings 44 are supported by a bearing casing 43 which is mounted on the inner casing 13 instead of the outer casing 11. The thrust bearings are maintained in a fixed relative position with respect to the inner casing and consequently the shaft 36 and impellers 37, which are partially dependent on the thrust bearings, are also maintained in a fixed relative position with respect to the inner casing. Thus, the rotating impeller ring 38 and the stationary casing ring 39 are maintained in axial alignment and leakage therebetween is controlled to a minimum.

Although only one embodiment of the present invention has been illustrated and described it will be apparent to those skilled in the art that various changes and modifications may be made therein without departing from the spirit of the invention or from the scope of the appended claims.

What is claimed is:

1. In a centrifugal pump: an outer casing having an open end; an inner casing having an open end mounted in spaced relationship within said outer casing; a shaft journaled in said inner casing extending axially therefrom to the exterior of said outer casing; a cover detachably mounted on said outer casing defining an aperture radially spaced about said shaft; a sleeve comprising a stuffing box radially spaced about said shaft and extending through said cover aperture in close relation thereto, one end of said stuffing box rigidly connected to the open end of said inner casing; a sealing means in sealing engagement with said stuffing box and said shaft; and an external thrust bearing casing having an open end rigidly connected to the second end of said stuffing box and radially spaced about said shaft.

2. In a centrifugal pump: an outer casing having an open end; an inner casing having an open end mounted in spaced relationship within said outer casing; a shaft journaled in said inner casing extending axially therefrom to the exterior of said outer casing; a cover detachably mounted on said outer casing defining an aperture radially spaced about said shaft; a sleeve comprising a stuffing box radially spaced about said shaft and extending through said cover aperture in close relation thereto, the interior end of said stuffing box being rigidly connected to and in sealing engagement with the open end of said inner casing; a sealing means in sealing engagement with said stuffing box and said shaft; and an external thrust bearing casing having an open end rigidly connected to and in sealing engagement with the exterior end of said stuffing box and radially spaced about said shaft whereby said bearing casing and inner casing are maintained in a fixed relative position.

3. In a double casing multiple stage centrifugal pump: an outer casing having an open end; an inner casing having an open end mounted in spaced relationship within said outer casing; a shaft journaled in said inner casing extending axially therefrom to the exterior of said outer casing; a cover detachably mounted on said outer casing defining an aperture radially spaced about said shaft; a sleeve comprising a stuffing box radially spaced about said shaft extending through said cover aperture and slidably mounted in close relation thereto, a first end of said stuffing box rigidly connected to the open end of said inner casing; a sealing means in sealing engagement with said stuffing box and said shaft; and an external thrust bearing casing containing a thrust bearing assembly lubricated by a fluid independent of that being pumped, said bearing casing having an open end rigidly connected to a second end of said stuffing box and radially spaced about said shaft, whereby said bearing casing and inner casing are maintained in a fixed relative position.

References Cited in the file of this patent

UNITED STATES PATENTS

| | | |
|---|---|---|
| Re. 19,826 | Aisenstein | Jan. 21, 1936 |
| 1,849,217 | Aisenstein | Mar. 15, 1932 |
| 2,668,501 | Lutz | Feb. 9, 1954 |
| 2,668,503 | Ross | Feb. 9, 1954 |
| 2,764,456 | Jacobs et al. | Sept. 25, 1956 |
| 2,859,698 | Buehler | Nov. 11, 1958 |